United States Patent

Hoffman

[15] 3,662,761
[45] May 16, 1972

[54] VALVE STRUCTURE WITH A U-SHAPED SPRING RETAINER

[72] Inventor: Joseph Willard Hoffman, Liverpool, Pa.
[73] Assignee: AMP Incorporated, Harrisburg, Pa.
[22] Filed: Mar. 23, 1970
[21] Appl. No.: 21,691

Related U.S. Application Data

[63] Continuation-in-part of Ser. No. 846,516, July 31, 1969, abandoned.

[52] U.S. Cl. ............................ 137/543.19, 29/157.1, 29/227, 137/612.1, 251/337, 277/205, 285/111, 285/382, 285/423
[51] Int. Cl. ................................................. F16k 17/04
[58] Field of Search ............ 285/111, 382, 423; 277/205; 251/334, 175, 337; 137/537, 538, 540, 541, 543.17, 543.19, 234.5; 29/225, 227

[56] References Cited

UNITED STATES PATENTS

| | | | |
|---|---|---|---|
| 2,401,856 | 6/1946 | Brock | 137/543.17 X |
| 3,247,967 | 4/1966 | Kucmerosky | 137/541 X |
| 3,308,847 | 3/1967 | Umann | 137/505.42 X |
| 3,036,594 | 5/1962 | Salisbury | 137/543.19 X |
| 2,103,108 | 12/1937 | Broecker et al. | 137/234.5 |
| 3,201,081 | 8/1965 | Lyon et al. | 251/175 X |
| 3,378,269 | 4/1968 | Castor | 277/205 |
| 3,512,789 | 5/1970 | Tanner | 277/153 X |
| 2,071,648 | 2/1937 | Moeller | 29/255 X |
| 3,010,156 | 11/1961 | Smith | 137/537 X |

Primary Examiner—Samuel B. Rothberg
Assistant Examiner—David J. Zobkiw
Attorney—Woodcock, Phelan and Washburn, William J. Keating, Ronald D. Grefe, William Hintze, Jay L. Seitchik, John P. Vandenburg and Frederick W. Raring

[57] ABSTRACT

A valve has a body provided with a passageway therethrough. A valve seat is located along the passageway. A sealing member is biased into sealing engagement with the valve seat via a spring member. A U-shaped retaining member is disposed in the passageway and in engagement with the spring member; it has outwardly directed sharp ends that dig into the wall of the passageway to seat the sealing member onto the valve seat in accordance with a prescribed pressure under which the spring member is placed by the retaining member. A modification of a sealing skirt provides better sealing characteristics.

7 Claims, 8 Drawing Figures

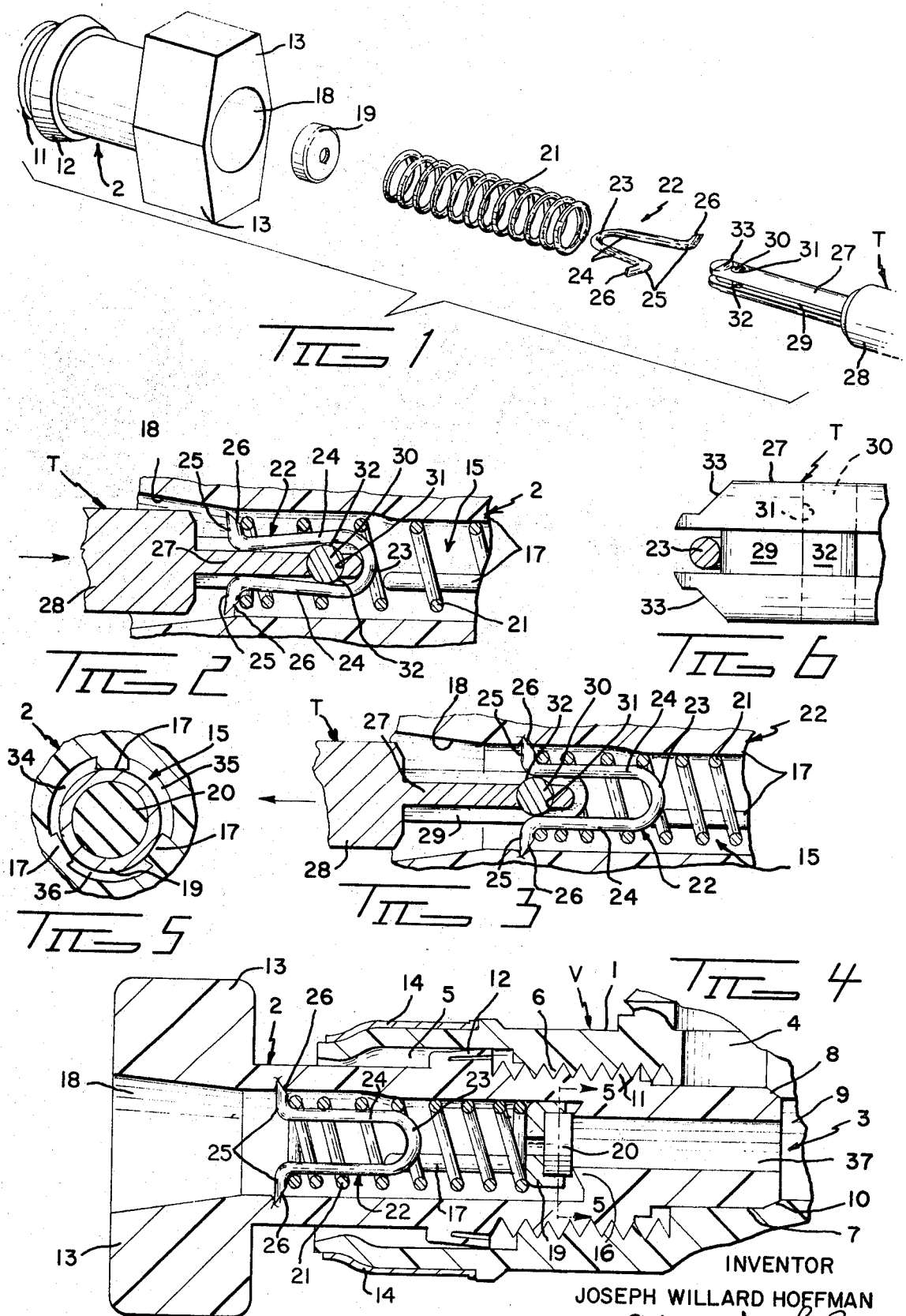

VALVE STRUCTURE WITH A U-SHAPED SPRING RETAINER

This application is a continuation-in-part of application Ser. No. 846,516 filed July 31, 1969 and now abandoned.

This invention relates to valve structures and more particularly to means for retaining a sealing member in engagement with a valve seat in accordance with a prescribed pressure.

The present invention is an improvement over a pressure responsive chips which has a passageway provided with a valve seal on which a sealing member is spring biased via a spring member held in position by a retaining member provided with teeth dug into the wall of the passageway. This pressure responsive valve proved unsatisfactory for the following reasons. The retaining member does not provide sufficient by-pass area to allow passage of a necessary amount of fluid over a predetermined time span when the valve operated due to increased pressure in the container on which the valve is located. The teeth of the retaining member dug chips out of the wall of the passageway during seating of the retaining member along the passageway and these chips have a tendency to become dislodged as a result of pressure and vibration thereon; the dislodged chips clog the by-pass areas in the retaining member thereby decreasing the flow of fluid released by the valve. The retaining member has a tendency to become unseated when the plastic material of the valve body becomes flowable as a result of a rise in temperature. When the valve is subjected to vibration, the retaining member tends to work loose and decrease the spring bias of the spring member or be completely dislodged from its seated position.

An object of the present invention is to provide retaining means for use in a passageway of a by-pass valve means which permits proper clearance so that fluid can readily escape from a pressurized container.

Another object is the provision of retaining means for use in a passageway of a by-pass valve means which does not form any foreign substances during the seating thereof in position in the passageway that would obstruct passage of fluid out of the passageway.

A further object is to provide means on the retaining means to facilitate insertion of the retaining means in position in the passageway of the valve means.

An additional object is the provision of a tool for inserting the retaining means in a securely seated position in the passageway of valve means.

Still a further object is a method of forming a valve in a passageway of a body member.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIG. 1 is an exploded perspective view of components to form a valve and one end of a tool to carry out the assembly;

FIG. 2 is a cross-sectional view illustrating the tool inserting a retaining member in position in a passageway of a valve body;

FIG. 3 is a view similar to FIG. 2 illustrating the tool being withdrawn from a passageway and securely seating the retaining member in position in the passageway;

FIG. 4 is a cross-sectional view of the valve assembly in position;

FIG. 5 is a view taken along lines 5—5 of FIG. 4; and

FIG. 6 is an enlarged view of a working end of the tool.

Figure 7:
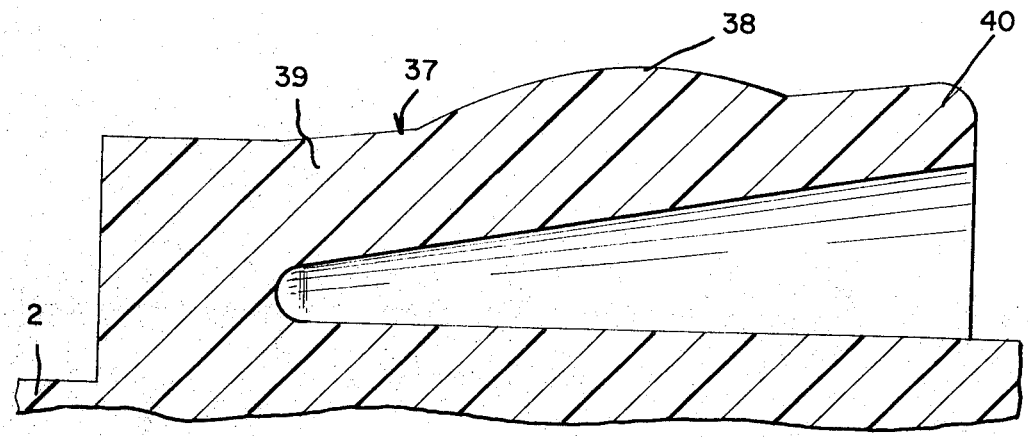
FIG. 7 shows a modification of the sealing skirt.

Turning now to the drawings, a valve V is illustrated in FIG. 4 and it includes a valve body 1 and a valve member or stem 2. A passageway 3 extends through valve body 1 and another passageway 4 is in communication with passageway 3. Passageway 3 includes a tubular sealing section 5, a threaded section 6 including a non-threaded bore 7 in communication with another passageway 4, a valve seat 8 and a bore 9. The valve body 1 and valve member 2 are made of a suitable plastic material such as, for example, nylon or the like.

Valve member 2 is provided with a seating surface 10 which is sealingly engageable with valve seat 8 when threaded section 11 is movable along threaded section 6 to thereby prevent the flow of fluid from passageway 3 into passageway 4 except when seating surface 10 has been moved away from valve seat 8. A stiffly flexible annular sealing skirt 12 is sealingly engageable with sealing section 5 as it is moved therealong by the rotation of valve member 2 under the influence of threaded sections 6 and 11. Sealing skirt 12 is unitary with valve member 2. When seating surface 10 is moved away from valve seat 8, sealing skirt 12 prevents a leakage out of passageway 3 and the pressure of the fluid against sealing skirt 12 increases the sealing effect thereof by forcing sealing skirt 12 tighter against sealing action 5. Wings 13 on valve member 2 enable an operator to effectively operate valve member 2 between its seated and unseated positions. Metal ferrule 14 is disposed along the exterior surface of valve body 1 along annular sealing section 5 and the outer end of ferrule 14 is necked down, as illustrated in FIG. 4 after valve stem 2 has been threadably mounted within passageway 3, thereby preventing valve member 2 from being removed from valve body 1. A passageway 15 extends through valve member 2 and it includes a valve seat 16. Passageway 15 is provided with inwardly directed projections 17 which are equidistantly spaced around passageway 15 from valve seat 16 to a position about halfway to the outer end of valve member 2. The outer end of passageway 15 is provided with a tapered section 18.

Apertured holding member 19 has a sealing member 20 disposed therein for engagement with valve seat 16 by coil spring 21 disposed between holding member 19 and retaining member 22 which is of relatively narrow cross-section and of U-shaped configuration including a bight 23 and legs 24. Free ends 25 of legs 24 are bent outwardly substantially normal with respect to legs 24 and they are provided with beveled surfaces 26 on the inner sides of free ends 25 so that the outer edges of free ends 25 define sharp edges.

Tool T is provided with a shank 27 extending outwardly from a handle 28. A continuous groove 29 extends along opposite sides of shank 27 and along the front end thereof which has a radiused configuration. A round pin 30 is secured in a hole 31 extending through shank 27 adjacent the front end thereof. Arcuate sections 32 of pin 30 extend into groove 29. Tapered surfaces 33 are located at the front end of shank 27.

To assemble the sealing assembly consisting of apertured-holding member 19 and sealing member 20, coil spring 21 and retaining member 22 in passageway 15 to provide a by-pass valve, the sealing assembly along with the coil spring are positioned in passageway 15 with projections 17 acting as guide means therefor. Retaining member 22 is then inserted into passageway 25 with bight 23 and legs 24 disposed within coil spring 21. Shank 27 of tool T is then brought into engagement with retaining member 22 with bight 23 being disposed within the front end of groove 29. Pressure is applied to tool T thereby forcing retaining member 22 within passageway 15 to a prescribed depth thereby forcing the sealing assembly into engagement with valve seat 16 in accordance with a prescribed pressure dictated by the compression exerted by spring 21. The sharpened edges of free ends 25 dig into the wall of passageway 15 and beveled surfaces 26 facilitate the insertion of retaining member 22 along passageway 15 until it has reached its predetermined seated position. When the seated position of retaining member 22 has been reached, tool T is withdrawn from passageway 15 and as it is being withdrawn therefrom, arcuate sections 32 engage the inner surfaces of legs 24 and move them in an outer direction thereby driving free ends 25 further into the wall passageway 15 which completely secures retaining member 22 in its seated position in passageway 15.

Tapered section 18 of passageway 15 along with the pressure of tool T on bight 23 of retaining member 22 in addition to beveled surfaces 26 on free ends 25 facilitate the movement of retaining member 22 along passageway 15 to its seated position. The pressure of tool T on bight 23 and the engagement of beveled surfaces 26 with the wall of passageway 15 causes legs 24 to be bent inwardly toward each other during the driving of retaining member 22 along passageway 15 and this action assists in the movement of retaining member 22 along passageway 15. Groove 29 in shank 27 of tool T receives legs 24 of retaining member 22 therein during the driving of retaining member 22 along passageway 15 which prevents legs 24 from becoming misaligned during the driving of retaining member 22 to its seated position. Tapered surfaces 33 of course facilitate the insertion of shank 27 within coil spring 21.

Arcuate areas 34, 35, and 36 between projections 17 at the valve seat 16 provide an area slightly less than the area of the bore at the engagement of the sealing member 20 on the valve seat of the bore 37. Such an arrangement permits a back pressure to be created on the sealing assembly of holding member 19 and sealing member 20 to cause collapse of coil spring 21 thereby permitting a sufficient opening between the sealing member 20 and the valve seat 16 which allows sufficient area therebetween so that a large amount of fluid is by-passed as a result of excessive pressure occurring at the valve seat; however, the back pressure created on the sealing assembly is such that operation of the by-pass valve occurs until the pressure of the fluid is less than the pressure created by coil spring 21 to maintain sealing member 20 in position on valve seat 16. Such an arrangement acts to control the action of the by-pass valve to the extent that loss of fluid is minimized due to the intermittent operation of the by-pass valve to permit the pressure of the fluid and the pressure created by the coil spring to be equalized when the conditions causing the excessive pressure on the fluid abate.

The sharp edges dig into the wall of the passageway in such a manner to assure that the retaining member remains permanently seated even during high temperature and vibration conditions so that the by-pass valve operates in accordance with the prescribed pressure gradient. The legs, bight and free ends of retaining member 22 are in the same plane and this does not interfere with the normal operation of the by-pass valve since no blockage takes place. No chips are created during assembly of the valve.

Figure 8:
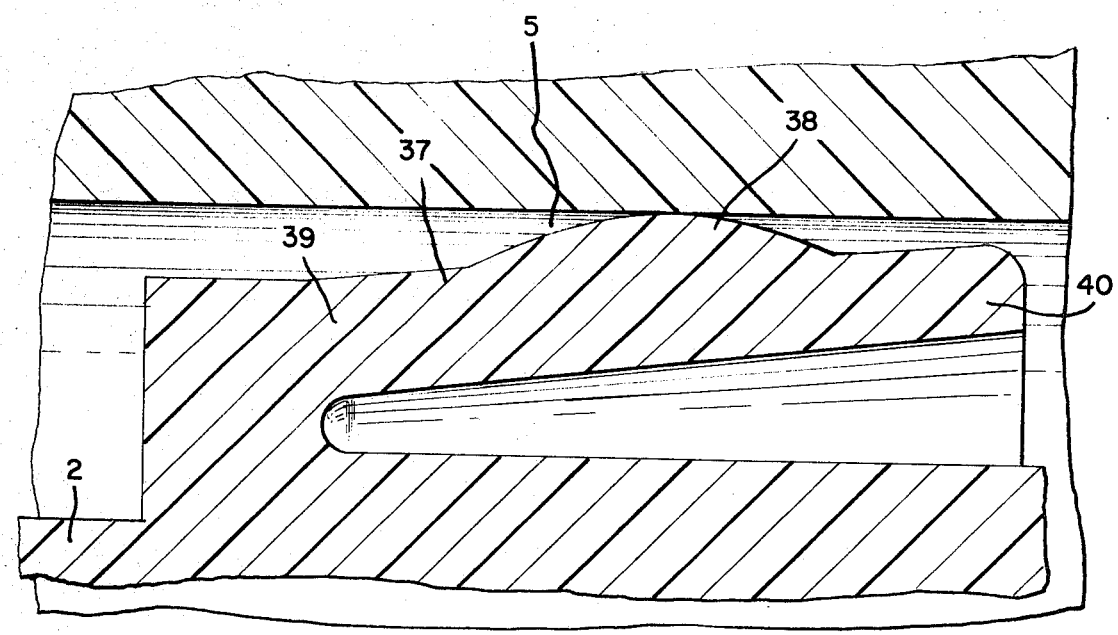
FIG. 8 shows the modified sealing skirt in position adjacent the sealing section.

A modification of the sealing skirt 12 is shown in FIGS. 7 and 8. Because of the high pressures to which it is subjected, the sealing skirt 12 may have a tendency to leak after it has been in place for some time. One factor which contributes to this is that there is a relatively large sealing surface between the skirt 12 and the sealing section 5. The skirt 37 is shown in FIG. 7 is less subject to leaking. The skirt 37 extends from the valve member 2 and is unitary with the valve member 2 just as in the previous embodiment. However, in this case the skirt 37 has a bulbous area 38. This bulbous area is sealingly engaged with the sealing section 5 when the valve member 2 is threaded into the body 1. The bulbous area 38 forms a seal over a relatively small area of the sealing section 5. Because the sealing area is of a small area there is a greater force per unit area applied to the seal. Because of this there is a reduced tendency for the seal to develop a leak.

Another factor contributing to the enhanced sealing capability is that the skirt 37 has greater thickness at the junction of the skirt and the body member 2 than at the end of the skirt. Note that the thickness of the skirt is greater at 39 than at 40. This increased thickness through the section 39 provides the skirt with greater resiliency so that the bulbous area 38 bears against the sealing section 5 with greater force. This of course enhances the sealing capability.

FIG. 8 shows the skirt in place when the valve member 2 is inserted into the body 1. Note that the bulbous area 38 makes contact with the sealing section 5 only throughout a relatively small area.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. A valve comprising: a valve member having a passageway extending therethrough,
   a valve seat in said passageway,
   a sealing member directed toward said valve seat,
   spring means in engagement with said sealing member,
   retaining means including a generally U-shaped elongated member of relatively narrow cross-section including a bight portion freely received in said spring means, said U-shaped member further including two leg portions integral with said bight portion and protruding from said spring means, with outwardly projecting portions provided on said leg portions in biting registration partially in a wall of said passageway and in compressing registration on said spring means, with said bight portion, said leg portions and said outwardly projecting leg portions being coplanar for minimizing internal obstruction of said passageway.

2. A valve according to claim 1 wherein said leg portions include free ends, which free ends have tapered inner surfaces facilitating insertion of said retaining means in said passageway and providing sharp edges for biting into said wall of said passageway.

3. A valve according to claim 1 wherein said passageway includes equally spaced projections extending axially therealong from said valve seat to a position spaced from said valve seat to define guide means for guiding said sealing member along said passageway.

4. A valve according to claim 1 further comprising:
   a body member having a passage extending therethrough,
   said passage in said body member having a sealing section, said valve member being movably disposed in the passage in said body member, and
   a unitary sealing skirt on said valve member which is in sealing engagement with said sealing section and remains in sealing engagement with said sealing section during movement thereof along said sealing section, said sealing skirt having a bulbous section around a periphery thereof for engagement with said sealing section only in a small seal area.

5. The valve according to claim 4 wherein said sealing skirt has greater thickness at the junction of the skirt and the body member than at the end of said skirt, said increased thickness providing said skirt with greater resiliency so that said bulbous area bears against said sealing section with greater force.

6. A valve according to claim 1 wherein said spring means is a coil spring and said bight portion and said leg portions are disposed therewithin with said bight portion being directed toward said sealing member.

7. The structure as recited in claim 1, and further including: projecting portions in said passageway and receiving said sealing member therebetween for guiding said sealing member toward said valve seat.

* * * * *